United States Patent [19]
Levecque et al.

[11] 4,159,199
[45] Jun. 26, 1979

[54] METHOD AND APPARATUS FOR FORMING FIBERS BY GAS BLAST ATTENUATION

[75] Inventors: Marcel Levecque, Birchrunville, Pa.; Jean A. Battigelli; Dominique Plantard, both of Rantigny, France

[73] Assignee: Saint-Gobain Industries, Neuilly-sur-Seine, France

[21] Appl. No.: 834,541

[22] Filed: Sep. 19, 1977

Related U.S. Application Data

[63] Continuation-in-part of Ser. No. 762,789, Jan. 25, 1977, and Ser. No. 676,755, Apr. 14, 1976, each is a continuation-in-part of Ser. No. 557,282, Mar. 11, 1975, Pat. No. 4,015,964, which is a continuation-in-part of Ser. No. 353,984, Apr. 24, 1973, Pat. No. 3,885,940.

[30] Foreign Application Priority Data

Aug. 23, 1977 [FR] France ............................ 77 25691

[51] Int. Cl.² ........................................... C03B 37/04
[52] U.S. Cl. ............................................. 65/5; 65/16; 264/12; 425/7
[58] Field of Search .................. 65/2, 5, 12, 16; 425/7; 264/12

[56] References Cited

U.S. PATENT DOCUMENTS

| | | | |
|---|---|---|---|
| 328,226 | 10/1885 | Kennedy et al. | 65/5 |
| 1,627,982 | 5/1927 | Maguet | 65/5 |
| 2,126,411 | 8/1938 | Powell | 65/5 |
| 3,009,205 | 11/1961 | Monson et al. | 65/5 X |
| 3,874,886 | 4/1975 | Levecque | 65/16 X |

FOREIGN PATENT DOCUMENTS

70097 10/1941 Czechoslovakia ............................ 65/16

*Primary Examiner*—Robert L. Lindsay, Jr.
*Attorney, Agent, or Firm*—John T. Synnestvedt; Kenneth P. Synnestvedt

[57] ABSTRACT

Gas blast attenuation is disclosed including the use of a pair of gaseous jets having axes lying in a common plane and directed to impinge upon each other preferably at an acute angle, the attenuable material being introduced into the influence of air induced by one of the jets in the region of impingement of the jets, and the combined jet flow of the two jets carrying the attenuable material into a zone of interaction between the combined jet flow and a larger gaseous blast.

25 Claims, 7 Drawing Figures

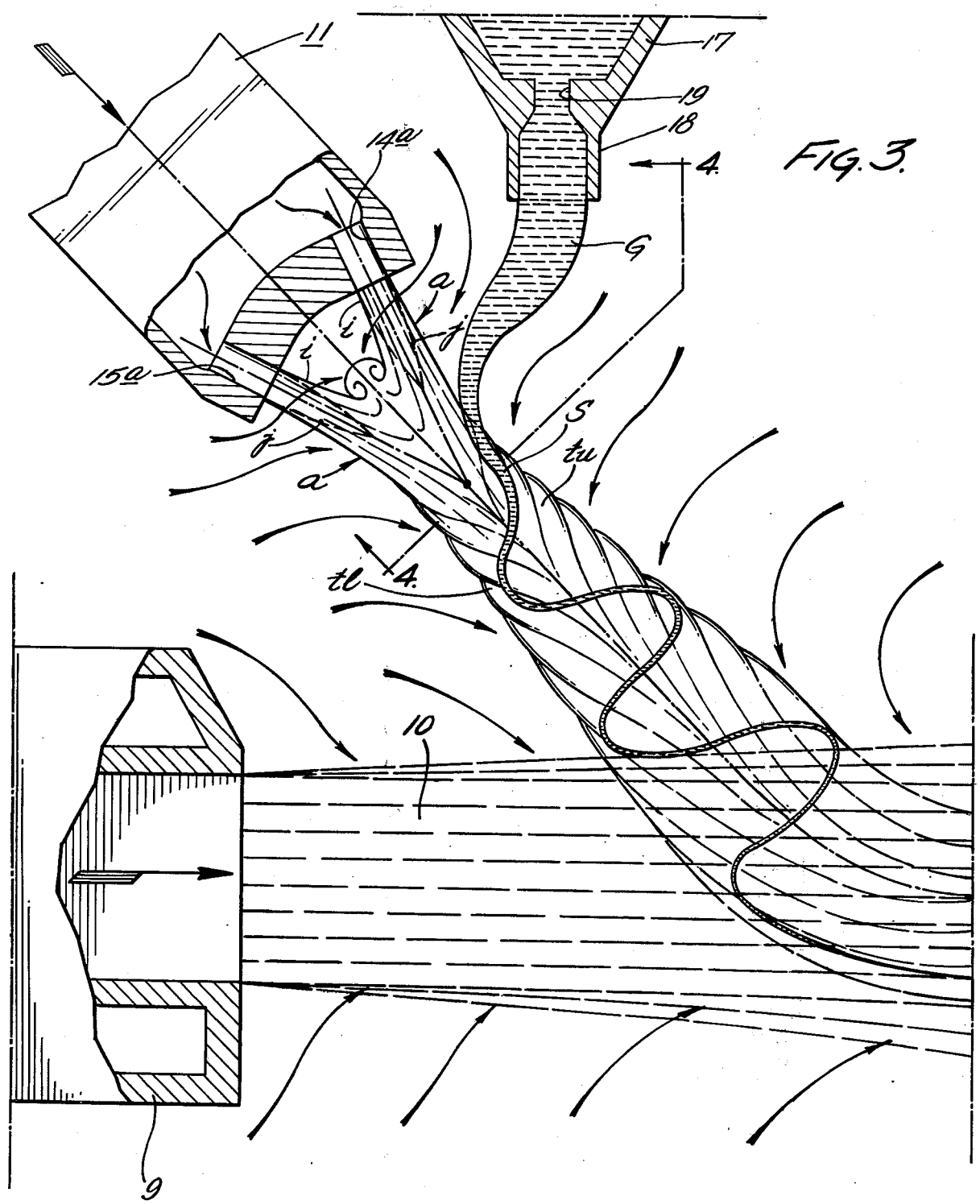

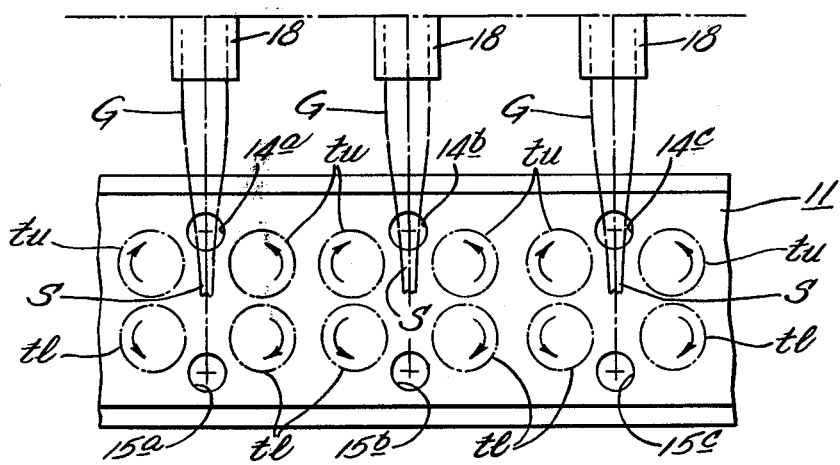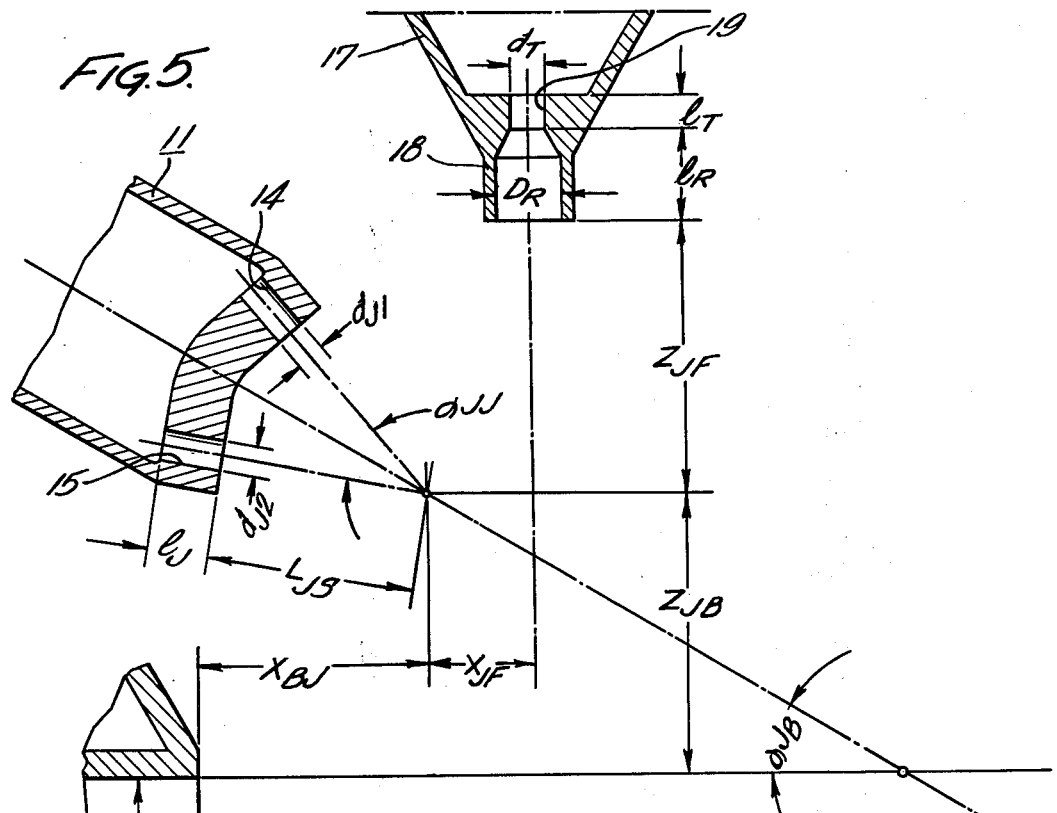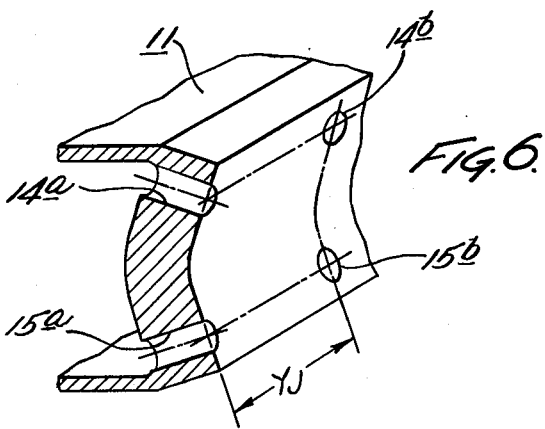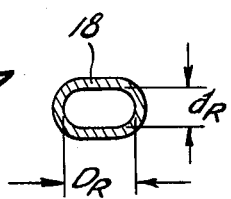

METHOD AND APPARATUS FOR FORMING FIBERS BY GAS BLAST ATTENUATION

CROSS REFERENCE

The present application is a continuation-in-part of our prior applications Ser. No. 762,789, filed Jan. 25, 1977, and Ser. No. 676,755, filed Apr. 14, 1976, which in turn are continuations-in-part of our application Ser. No. 557,282, filed Mar. 11, 1975, and issued as U.S. Pat. No. 4,015,964, which, in its turn, is a continuation-in-part of our application Ser. No. 353,984, filed Apr. 24, 1973, and issued as U.S. Pat. No. 3,885,940.

BACKGROUND AND OBJECTS

This invention relates to the formation of fibers from attenuable material and while the invention is adapted for use in the formation of fibers from a wide variety of attenuable materials, it is particularly suited to the attenuation of various thermoplastic materials, especially mineral materials such as glass and similar compositions which are rendered molten by heating. As with the technique of the prior application Ser. No. 762,789, the present invention may be employed in connection not only with various mineral materials, but also with certain organic materials which are attenuable, such as polystyrene, polypropylene, polycarbonate and polyamides. Since the equipment or apparatus is especially useful in the attenuation of glass and similar thermoplastic materials, the following description refers to the use of glass by way of illustration.

Certain techniques for utilizing whirling currents or tornadoes for the attenuation of molten glass have been disclosed by us in prior applications above identified, such techniques being identified as toration. For example, U.S. Pat. No. 3,885,940, above identified, and also the companion U.S. Pat. No. 3,874,886, disclose development of pairs of counter-rotating tornadoes by directing a gaseous jet into a larger gaseous blast, thereby creating a zone of interaction including pairs of such tornadoes, and into which zone a stream of molten glass is delivered, with resultant attenuation of the glass stream.

In the equipment illustrated in prior U.S. Pat. Nos. 3,885,940 and 3,874,886, the orifice from which the glass stream is delivered to the zone of interaction is located at or adjacent to the boundary of the blast. In our prior application Ser. No. 557,282, now U.S. Pat. 4,015,964, toration arrangements are disclosed in which the glass orifice is positioned in spaced relation to the boundary of the blast, and in which the glass stream is delivered by gravity to the zone of interaction established by the interaction of a jet and a larger blast.

In prior applications Ser. No. 762,789 and 676,755, both the glass orifices and the jet orifices are spaced from the boundary of the blast, and the glass streams are delivered by the action of the jets into zones of interaction of the jets with the blast. In the applications just mentioned, the glass streams are also subjected to two stages of attenuation, one stage occurring in the jet and the other in the blast.

Still further in our application Ser. No. 762,789, the secondary or carrier jet which delivers the glass into the zone of interaction with the blast is caused to develop a stable zone of laminar flow lying between a pair of counter-rotating whirls or tornadoes, and the glass stream is delivered to the laminar zone and thereafter enters the region of the tornadoes of the carrier jet, which latter merge downstream of the carrier jet, but before the carrier jet reaches the principal blast. As is pointed out in our application Ser. No. 762,789, the operation just described results in a two-stage attenuation, the first stage taking place as the glass stream is advanced into the influence of the tornadoes of the carrier jet, and the second stage taking place after the carrier jet and the partially attenuated stream enter the zone of interaction of the carrier jet with the blast.

According to the disclosure of said application Ser. No. 762,789, the zone of laminar flow and the tornadoes of the carrier jet are developed as a result of deflection of individual carrier jets provided for each fiberizing center, such deflection being effected by the use of a guiding or deflecting element which causes the jet to change its path. As is brought out in said application Ser. No. 762,789, such deflection of a carrier jet contributes stability of operation, notwithstanding the delivery of the glass to the carrier jet at a point spaced appreciably from the boundary of the principal blast.

The present invention, in common with application Ser. No. 762,789, has as a major objective, the stabilizing of the stream of glass or other attenuable material by development of a zone of laminar flow between tornadoes established in a jet flow stream. However the jet flow system of the present invention is somewhat different from that of said prior application, but it also provides various of the advantages thereof together with certain other advantages which are distinctive to the technique of the present invention, as is developed hereinafter.

In accordance with the present invention, instead of employing a structural element or means for guiding or deflecting individual carrier jets for each fiberizing center, the carrier jets are arranged in pairs, one pair for each fiberizing center, the jets of each pair being directed along converging axes lying in a common plane to provide for impingement of the jets on each other in said common plane thereof, thereby causing the combined jet flow of each pair of jets to spread laterally toward opposite sides of the common plane of the jet axes. According to the invention, the lateral spreading of the combined jet flow of each pair of jets is limited or obstructed, preferably by positioning the pairs of jets sufficiently close to each other to provide for impingement of the spreading combined jet flow of each pair of jets on the combined jet flow of adjoining pairs of jets. The obstruction of the spreading combined flow of the pairs of jets develops pairs of spaced tornadoes in the jet flow, with zones of laminar flow between the pairs of tornadoes.

In the system of the present invention streams of glass or other attenuable material are fed to the jet flow in the region of the zone of laminar flow from a position in the common plane of the jet axes but offset to one side of both jets. This results in some attenuation of the glass streams, but in the preferred practice of the invention a gaseous blast is directed in a path intercepting the combined jet flow of the pairs of jets, to provide for further attenuation.

Another characteristic of the invention consists of using two jets having approximately the same dimensions for each fiberization center. The kinetic energies of these two jets would preferably be substantially equal.

In the technique of the present invention the tornadoes established in the combined flow of each pair of jets converge downstream of the zone of laminar flow, and the merged jet flow proceeds in a direction to penetrate through the boundary of the principal blast, such penetration creating a zone of interaction also characterized by the generation of a pair of tornadoes according to the toration technique disclosed in the prior U.S. patents fully identified above.

Thus, each stream of glass is subjected to a preliminary gas blast attenuation between the pairs of tornadoes established by the pairs of carrier jets, and the partially attenuated stream is further attentuated in the zone of interaction of the combined carrier jet flow with the principal blast. In this way two-stage attenuation of a single fiber is effected and long fibers are produced without fragmentation.

How the foregoing objects and advantages are obtained, together with others which will occur to those skilled in the art will appear more fully from the following description referring to the accompanying drawings.

BRIEF DESCRIPTION OF THE DRAWINGS

FIG. 3 is an enlarged vertical sectional view through the components of one fiberizing center in the plane of the jet orifices;

FIG. 4 is a fragmentary transverse sectional view taken substantially as indicated by line 4—4 applied to FIG. 3;

FIG. 5 is a fragmentary sectional view of the major components of the fiberizing system, particularly illustrating certain dimensions to be taken into account in establishing operating conditions in accordance with the preferred practice of the present invention;

FIG. 6 is a fragmentary partially sectioned view indicating the relationship between adjacent jet orifices; and FIG. 7 is a transverse sectional view through a portion of the delivery means for the attenuable material, also indicating certain dimensions to be taken into account.

DETAILED DESCRIPTION

Figure 1:
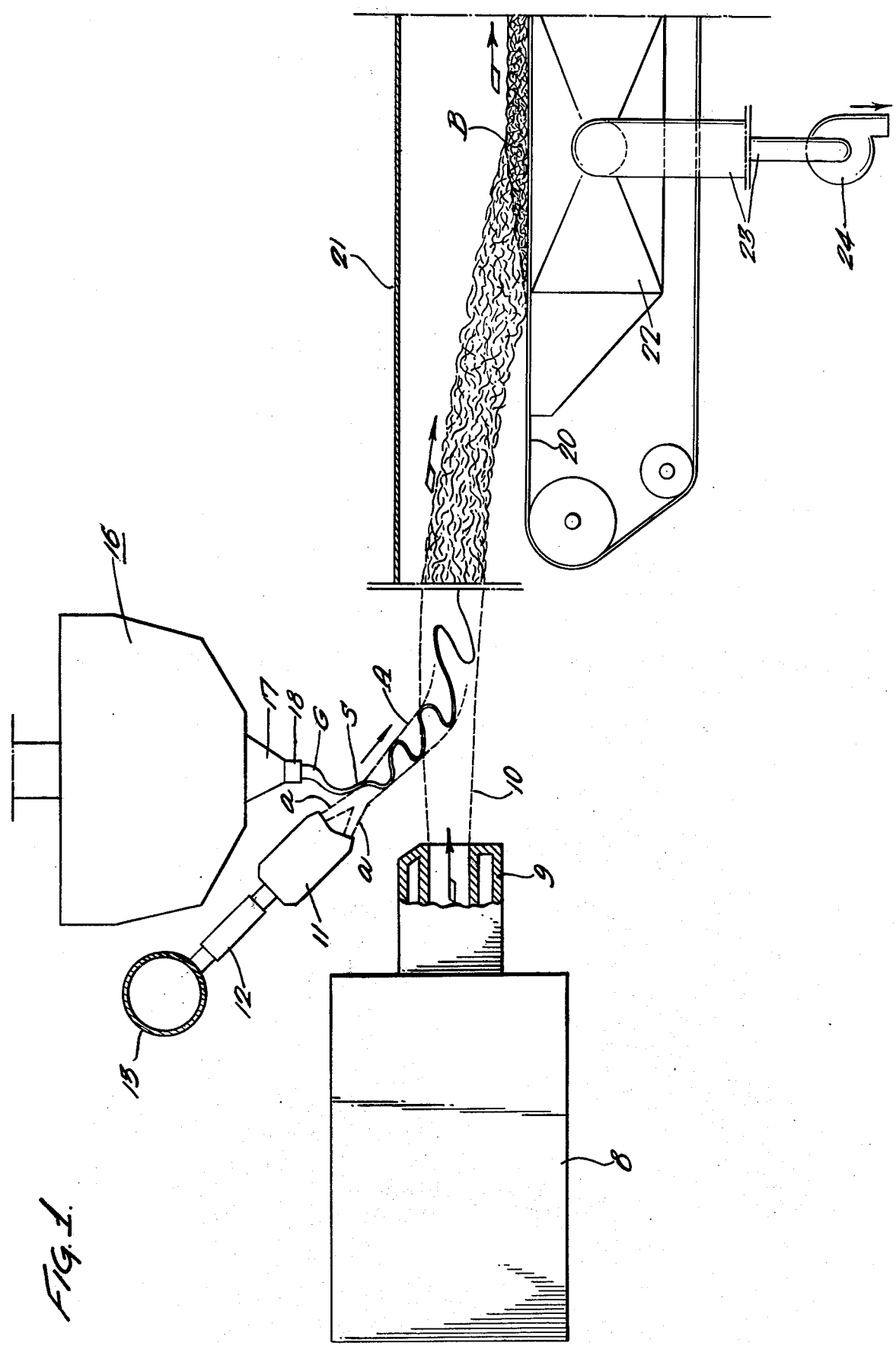
FIG. 1 is a somewhat diagrammatic elevational view of the major fiber producing and fiber collecting components of a system according to the invention, with certain parts shown in vertical section.

Referring first to FIG. 1, a blast generator or burner is indicated in outline at 8, the generator having a delivery device 9 from which a blast 10 is discharged. In the embodiment illustrated this discharge occurs in a generally horizontal direction, but it is to be understood that the discharge may be directed in other directions.

Figure 2:
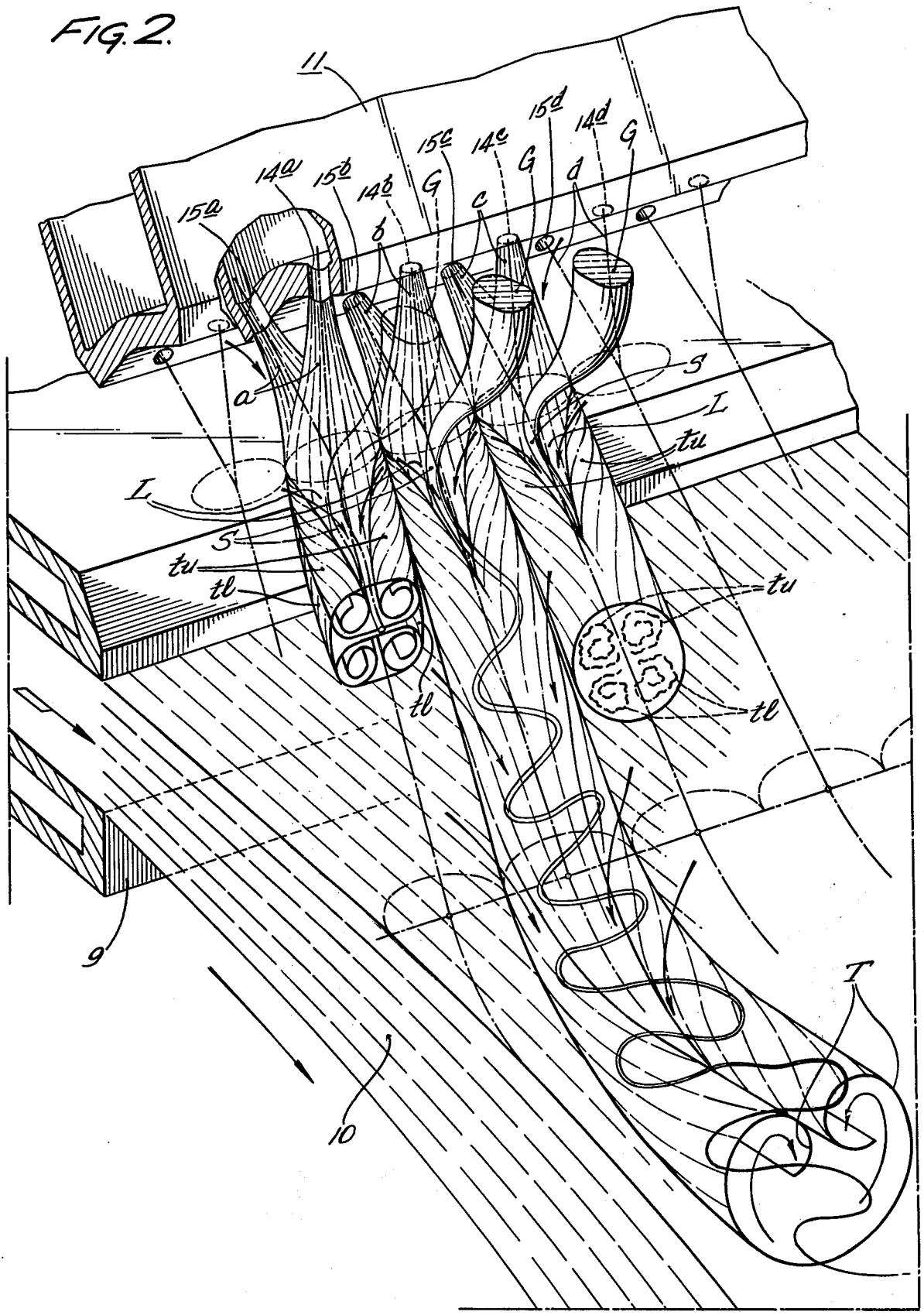
FIG. 2 is an enlarged perspective diagrammatic view illustrating the fiberizing action of the equipment shown in FIG. 1.

A manifold 11 for compressed gaseous medium such as compressed air is supplied with gas from a supply pipe 13 through a connection 12. As best seen in FIGS. 2 and 3 the manifold 11 is provided with pairs of jet orifices 14 and 15, the series of such pairs of orifices being indicated in FIG. 2 by the numerals 14a-15a, 14b-15b, 14c-15c, 14d-15d, and 14e-15e. The jets delivered from each of the pairs of orifices are indicated by the corresponding letters above, and in this connection it is noted that while three pairs of jets appear in the perspective view of FIG. 2, only a single pair of jets (a—a) appears in FIGS. 1 and 3.

As generally represented in FIG. 1 the pair of jets at each fiberizing center, for instance jets a—a impinge upon each other in their common plane and produce a combined carrier jet flow indicated at A in FIG. 1, in which a stream of attenuable material is subjected to a preliminary stage of attenuation. The combined jet flow proceeds downwardly and penetrates the blast 10 creating a zone of interaction between the jet and the blast which is utilized for a second stage of attenuation.

In the arrangement as shown in FIGS. 1 and 3 a glass supply means is generally indicated at 16, this means having a bushing 17, and the bushing having a series of spaced glass discharge devices 18 each fed from a metering orifice 19. Glass bulbs or cones G are delivered from the devices 18, and from the bulbs, streams of glass S are delivered in a downward direction, one such bulb and stream being included at each of the fiberizing centers.

The fibers formed from a series of fiberizing centers spaced transversely of the blast 10 are deposited upon a foraminous conveyor or belt 20 in the form of a fiber blanket B, as appears in FIG. 1. This fiber laydown occurs within a chamber defined, for example, by wall structure such as indicated at 21. Suction boxes are desirably provided below the conveyor 20, as indicated at 22, the boxes being connected by ducts 23 with one or more suction fans such as diagrammatically indicated at 24.

The attenuating action effected by the equipment as described above can best be explained and analyzed by reference to FIGS. 2, 3 and 4.

As already indicated above, the action at each fiberizing center is preferably related to the action of the jets or the jet flow in adjoining fiberizing centers. In FIG. 2, the illustration represents the complete action at the fiberizing center corresponding to jets b—b, but represents only a portion of the action occurring at the fiberizing centers of jets a—a and c—c. In FIG. 3 the action at the fiberizing center represented by jets a—a is shown on an enlarged scale, and in analyzing the operation, attention is first directed to the fact that immediately following the delivery of any gaseous jet from an orifice, the jet induces ambient air. Thus, as shown in FIG. 3, each of the jets a comprises a central jet core indicated by the letter j and a surrounding envelope of gases including induced air indicated by the letter i. This envelope rapidly expands as the jet flow proceeds, and as shown in FIG. 3 the jet core remains as a relatively short cone shaped central portion. Such a core has the velocity of the jet as delivered from the orifice, but the surrounding envelope of induced air is of diminished velocity as the jet flow proceeds. In both FIGS. 2 and 3 numerous arrows have been applied indicating the induction of air by the jet flow, and, in FIG. 3 also by the blast flow.

When employing a pair of jets of substantially the same kinetic energy per unit of volume and preferably also of substantially the same size, with the two jets having axes lying in a common plane and converging toward each other so that the jets impinge upon each other preferably at an acute angle, the combined flow of the jets downstream of the region of impingement is caused to spread laterally, i.e., is caused to spread in directions transverse to the common plane of the axes of the two jets. It is contemplated according to the invention that the pairs of jets or the planes of the axes thereof be positioned sufficiently close to each other so that the lateral spreading of the combined flow is obstructed by virtue of impingement of the combined flow of one pair of jets upon the laterally spreading combined flow of the adjoining pairs of jets. This impingement of the combined flow of adjoining pairs of jets develops two pairs of miniature tornadoes in each jet flow, with the points of origin or apices of the tornadoes of each pair being positioned in spaced relation toward opposite sides of the common plane of the axes of the jets. When viewed as in FIGS. 2, 3 and 4, the upper pair of these miniature tornadoes, indicated at tu—tu, have whirling currents circulating or turning in directions toward each other at the upper side of the tornadoes and away from each other at the lower side, as indicated by the direction arrows applied to FIG. 4. On the other hand, the lower pair of tornadoes indicated by letters tl turn in the opposite directions, as is indicated by the arrows applied to FIG. 4.

Between the two pairs of tornadoes in the region of impingement of the jets upon each other, a zone L of laminar flow associated with the tornadoes is developed, this zone having high intensity in-flow of induced air, and it is into this laminar flow zone at the side of the upper pair of tornadoes that the stream of glass is introduced. As clearly appears in FIGS. 2 and 3, the stream S of the glass is developed from the glass bulb, which bulb or cone is located in a position horizontally offset from the jet delivery device. However, because the glass of the bulb G is in attenuable or flowable condition as released from the delivery device and the stream S of the attenuable glass is deflected from the horizontally offset position of the bulb toward the laminar flow zone L, this deflection occurring as a result of the intense in-flow of induced air, this effect assures delivery of the stream of attenuable material into the laminar zone. Indeed, even with some misalignment of the glass delivery device 18 with respect to the pairs of jets, the in-flow of induced air will automatically compensate for such misalignment and bring the glass stream into proper position.

From the above, it will be seen that by developing the pairs of tornadoes with the intervening zone of laminar flow at each fiberizing center, and by delivering the attenuable material in attenuable condition into the region near said zone, the induced air automatically carries the stream of attenuable material into the zone of laminar flow and automatically compensates for misalignment, thereby providing a highly stable introduction of the attenuable material into the system.

The arrangement as described above and the action of the induced air currents provides for stable introduction of the attenuable material into the system, even where the glass delivery devices are appreciably spaced away from the jet delivery devices, which is desirable in order to facilitate maintenance of appropriate temperature control for both the glass delivery devices and the jet delivery devices.

As seen in FIG. 2, the pairs of tornadoes tu and tl tend to merge downstream of the laminar zone L, and as the flow progresses downstream the tornadoes tend to lose their identity, as is indicated (toward the right of FIG. 2) by the sectional showing of the two pairs of tornadoes originating with the jets c—c. The merged jet flow of each pair of jets then proceeds downward to penetrate the blast 10 as is indicated in FIG. 2 for the jet flow originating with the pair of jets b—b, and within the flow of the blast, the jet develops the zone of interaction characterized by an additional pair of tornadoes indicated at T, this interaction being identified as toration and fully explained in the U.S. Pat. Nos. 3,874,886 and 3,885,940 identified above.

It will also be seen that the plane containing the axes of the jets cuts through the blast in a direction substantially parallel to the direction of the flow of the blast.

Also as shown in FIGS. 2 and 3, each stream S of glass is subjected to a preliminary attenuation in the jet flow between the zone of laminar flow or point of introduction of the glass, and the point of penetration of the jet into the blast, and the partially attenuated stream is subjected to further attenuation in the zone of interaction of the jet flow with the blast. As indicated in the drawings, these two stages of attenuation are effected without fragmentation of the glass stream, so that each stream produces a single fiber.

The action of the jets at each fiberizing center, particularly in the development of the pairs of tornadoes with the intervening zone of laminar flow, is achieved by employment of a pair of jets each of which is preferably of substantially the same kinetic energy per unit of volume; preferably also, the jets of each pair are of approximately the same cross sectional area and cross sectional shape, but some leeway is permissible with respect to the relation between the cross sectional areas of the two jets of a pair, particularly if the kinetic energy per unit of volume of each jet is substantially the same.

Moreover, each jet need not necessarily have exactly the same cross sectional dimensions in directions transverse to and parallel to the common plane of the axes of the two jets. In addition, these two dimensions need not necessarily be identical for the individual jets of each pair. However, it is preferred that the cross sectional dimension should be substantially the same for each jet and for the jets of each pair; and further, that the dimensions of the jets of adjoining pairs should be substantially the same, in order to provide uniformity in the development of the pairs of tornadoes with the intervening zones of laminar flow, as the laterally spreading combined jet flow of each pair of jets impinges upon the combined jet flow of adjoining pairs of jets. Uniformity of the jets at each fiberizing center provides uniformity of fiberizing conditions in the toration zones created by the penetration of the jets into the blast.

If desired, the jet flow originating with each pair of jets may be utilized for purposes of fiber attenuation, without employment of a blast, although for most purposes, and especially where relatively fine fibers are desired, it is preferred to employ not only the preliminary attenuation which is effected by the jet flow, but also the additional attenuation which is effected by toration incident to penetration of the jet flow into the blast.

For purposes of penetration of the jet flow into the blast, when the jet flow reaches the blast it should have higher kinetic energy per unit of volume, than the blast.

It is also to be noted that for the purpose of establishing the zone of laminar flow, into which the stream of glass may be introduced without fragmentation, it is important that the jets be established so that their axes are directed substantially in a common plane and impinge upon each other in said plane preferably at an acute angle, for instance within the range hereinafter identified.

Various other parameters are also desirably observed, as indicated herebelow in connection with FIGS. 5, 6 and 7 and the following tables.

FIG. 5 illustrates the three major components of a fiberizing center, i.e., the means for developing the blast, the means for developing the jet, and the means for introducing the attenuable material, each of these three means being shown fragmentarily in section in the same general manner as in FIG. 3. In FIG. 5 symbols or legends have been applied to identify various parameters, such as dimensions and angles, all of which are referred to in one or another of the tabulations herebelow. Some of these symbols or legends also appear in FIGS. 6 and 7. The tables give not only the most appropriate ranges for the dimensions and angles, but also include preferred values.

In considering the symbols and legends, reference is first made to the bushing 17 and the devices 18 for the supply of the attenuable material, in connection with which see table I just below.

TABLE I

| Symbol | (mm) Preferred Value | Range |
|---|---|---|
| $d_T$ | 2 | 1 → 5 |
| $l_T$ | 1 | 1 → 5 |
| $l_R$ | 5 | 0 → 10 |
| $d_R$ | 2 | 1 → 5 |
| $D_R$ | 5 | 1 → 10 |

With regard to the glass supply orifice, it is pointed out that the glass or other attenuable material may be supplied to the fiberizing centers either by means of a series of individual supply orifices, or alternatively, the glass or attenuable material may be supplied through a feed slot, which is common to a plurality of the fiberizing centers, in the general manner explained in our prior U.S. Pat. No. 3,885,940. Since the individual pairs of jets at the individual fiberizing centers create induced air flow currents, tending to draw the streams of attenuable material into the low pressure or laminar flow zones, this tendency, in the case of employment of a common feed slot, serves to subdivide the glass issuing from the slot and form individual streams of glass each one of which enters one of the laminar flow zones. In this case, the axis of each glass cone is automatically positioned in the plane containing the axes of the corresponding pair of jets.

With respect to the jet orifices, it is pointed out that each pair of orifices may be associated with a common manifold or supply device, as is illustrated in the drawings of the present application; but if desired, the upper and lower jet orifices of the pairs may be associated with separate superimposed manifolds.

With reference to the jet supply, see the following table:

TABLE II

| Symbol | (JET) (mm, degree) Preferred Value | Range |
|---|---|---|
| $d_{J1}$ | 2 | 0.5 → 4 |
| $d_{J2}$ | 2 | 0.5 → 4 |
| $l_J$ | 3 | 1 → |
| $L_{JS}$ | 5 | 2 → 10 |
| JJ | 45 | 10 → 90 |
| JB | 45 | 20 → 90 |

With regard to the blast, note the following table:

TABLE III

| Symbol | (BLAST) (mm) Preferred Value | Range |
|---|---|---|
| $l_B$ | 10 | 5 → 20 |

In addition to the foregoing dimensions and angles involved in the three major components of the system, certain interrelationships of those components are also to be noted, being given in the table just below.

TABLE IV

| Symbol | (mm) Preferred Value | Range |
|---|---|---|
| $Z_{JF}$ | 8 | 1 → 15 |
| $Z_{JB}$ | 17 | 12 → 30 |
| $X_{BJ}$ | 0 | −20 → +5 |
| $X_{JF}$ | 5 | 0 → 8 |

In connection with the symbol $X_{BJ}$, it will be noted that in the illustration of FIG. 5, $X_{BJ}$ is indicated at a negative value, i.e., with the blast nozzle in a position (in relation to the direction of flow of the blast) which is upstream of the position of the point of intersection of the jet axes.

The number of fiberizing centers may run up to as many as 150, but in a typical installation where glass or some similar thermoplastic material is being fiberized, a bushing having 70 delivery devices or orifices is appropriate.

In connection with the operating conditions, it is first pointed out that the conditions of operating the system according to the present invention will vary in accordance with a number of factors, for example in accordance with the characteristics of the material being attenuated.

As above indicated, the system of the present invention is capable of use in the attenuation of a wide range of attenuable materials. In the attenuation of glass or other inorganic thermoplastic materials, the temperature of the bushing or supply means will of course vary according to the particular material being fiberized. The temperature range for materials of this general type may fall between about 1400° and 1800° C. With a typical glass composition, the bushing temperature may approximate 1480° C.

The pull rate may run about 20 to about 150 kg/hole per 24 hours, typical values being from about 40 to about 60 kg/hole per 24 hours.

Certain values with respect to the jet and blast are also of significance, as indicated in tables just below in which the following symbols are used.

T = Temperature
P = Pressure
V = Velocity
$\rho$ = Density

TABLE V

| Symbol | JET SUPPLY Preferred Value | Range |
|---|---|---|
| $P^J$ | 2.5 | 1 → 15 |
| $T_J$ (°C.) | 20 | 0 → 1500 |
| $V_J$ (m/sec) | 330 | 330 → 900 |
| $(\rho V^2)$ (bar) | 2.1 | 0.8 → 40 |

TABLE VI

| Symbol | BLAST Preferred Value | Range |
|---|---|---|
| $p^B$ (mbar) | 95 | 30 → 250 |
| $T_B$ (°C.) | 1450 | 1350 → 1800 |
| $V_B$ (m/s) | 320 | 200 → 550 |
| $(\rho_B V^2)$ (bar) | 0.2 | 0.06 → 0.5 |

It is to be kept in mind that where both the jet and blast are employed, it is contemplated that the flow of the combined jets shall have a width smaller than that of the blast and preferably have a cross section smaller than that of the blast and shall penetrate the blast in order to develop a zone of interaction in which the secondary or toration phase of the attenuation will be effected. For the purpose, the combined jet flow must have greater kinetic energy than the blast, per unit of volume in the operational area thereof. A typical ratio of the kinetic energy of the jet to the blast is 10 to 1. Thus, in terms of the kinetic energy values given in Tables V and VI above: $(\rho V^2)J/(\rho V^2)B = 10$.

The foregoing techniques is advantageous from a number of standpoints in connection with the fiberization of various materials and especially of thermoplastic mineral compositions such as glass and other similar materials. Thus, stability of feed is provided, notwithstanding substantial separation of the major components of the system, including substantial separation or interspacing between the glass supply means, the jet device, and the blast generator. Separation of these components, in turn, makes possible more accurate control of the relative temperatures prevailing in or at the several components, and temperature control is desirable for effective and efficient fiberization.

The technique of the present invention provides for the development of the pairs of tornadoes in the jet flow and thus for stability of feed by the employment of pairs of jets impinging upon each other, and without the necessity for introduction of other mechanical components influencing the jet path or flow. This is desirable because it minimizes structural parts in the vicinity of the glass feed and thus reduces sticking and accumulation of unfiberized glass on such parts. Elimination of structural parts along the path of the jets is also desirable because structural parts necessarily require positioning with great accuracy, and with the employment of pairs of jets in accordance with the present invention, no problem remains with regard to positioning of mechanical parts along the paths of the jets.

From the foregoing, it will be seen that the fiberization technique of the present invention provides a particularly desirable combination of characteristics and advantages, including the following.

In the preferred practice of the invention, according to which the pairs of jets at each fiberizing station are employed for purposes of feed or delivery of the attenuable material into a toration zone established by the interaction of the combined jet flow with a gaseous blast, the employment of the pairs of jets at each fiberizing station provides stability in the introduction of the stream of attenuable material into the jet flow and thus also into the toration zone in the blast. Moreover, this stability is achieved while at the same time making possible appreciable spacing or separation between the major components of each fiberizing center, i.e., the means for introducing the attenuable material, the means for developing the jets, and the means for developing the gaseous blast. Such separation of the major components of the fiberizing center is important for several reasons and particularly because of the desirability of avoiding excessive heat transfer from one component to another, in view of which the desired or optimum temperature condition may be established and maintained for each of the three components of the fiberizing system.

In connection with the foregoing, it is mentioned that it is advantageous to employ jet supply fluid, such as compressed air at a temperature in the neighborhood of room temperature, whereas the source of attenuable material, for instance glass, and also the means for developing the blast, are both desirably maintained at relatively high temperatures. These desired temperature differentials may be effectively established in a system according to the present invention, because the arrangement of the invention permits appreciable separation of the components.

In addition to the foregoing, the arrangement of the present invention achieves the advantages referred to above without the necessity for the employment of structural parts along the path of the individual jets or of the combined jet flow of the pairs of jets provided at each fiberizing center. Thus, lateral spreading of the jet flow is provided by virtue of the impingement of the jets of each pair upon each other; and the obstruction of the spreading is effected by positioning the adjoining pairs of jets sufficiently close to each other so that the lateral spreading at each fiberizing center results in impingement of the jet flow at each fiberizing center upon the adjoining jets. In this way, the lateral obstruction of the combined jet flow, with the consequent development of the pairs of tornadoes, each having the intervening zone of laminar flow, is accomplished without the necessity for employment of structural parts adjacent to the paths of the jets, and thus without the problems of erosion, thermal deterioration or the necessity for precise positioning of structural parts, as would necessarily be encountered where structural parts were relied upon for development of the tornadoes zones of the jets.

We claim:

1. A method for forming a fiber from attenuable material, comprising directing a pair of gaseous jets along converging axes lying substantially in a common plane to provide for impingement of the jets on each other with consequent lateral spreading of the combined jet flow in a plane perpendicular to said common plane, obstructing the lateral spreading of the combined jet flow and thereby generating a pair of tornadoes in the edge portions of the combined flow of the jets with the tornadoes spaced from each other in said perpendicular plane toward opposite sides of said common plane and having a zone of laminar flow intervening therebetween and lying in said perpendicular plane, and delivering a stream of attenuable material in attenuable condition into said combined jet flow in the zone of laminar flow and from a point offset toward one side of both jets of the pair and of said combined jet flow.

2. A method as defined in claim 1 in which the jets of the pair have substantially the same kinetic energy per unit of volume.

3. A method as defined in claim 2 in which the jets have substantially the same cross sectional area.

4. A method as defined in claim 1 and further including generating a gaseous blast directed in a path intercepting the combined jet flow, the combined jet flow having a cross sectional dimension smaller than that of the blast in a direction transverse the blast, and the combined jet flow having kinetic energy per unit of volume greater than that of the blast so that the combined jet flow penetrates the blast and carries the attenuable material into the zone of interaction between the jet flow and blast.

5. A method for forming a fiber from attenuable material, comprising directing a pair of gaseous jets along converging axes lying substantially in a common plane to provide for impingement of the jets on each other with consequent lateral spreading of the combined jet flow, generating a pair of tornadoes in the edge portions of the combined flow of the jets, the tornadoes being spaced from each other toward opposite sides of said common plane and having a zone of laminar flow intervening between the tornadoes, generating a gaseous blast directed in a path transverse to and intercepting the combined jet flow, the combined jet flow having a cross sectional dimension smaller than that of the blast in a direction transverse to the blast but having kinetic energy per unit of volume greater than that of the blast with consequent penetration of the jet into the blast, and delivering a stream of attenuable material in attenuable condition into said zone of laminar flow from a region lying in said common plane and offset toward one side of both jets of the pair.

6. A method for forming a fiber from attenuable material, comprising directing a pair of gaseous jets along converging axes lying substantially in a common plane to provide for impingement of the jets on each other with consequent lateral spreading of the combined jet flow, generating a pair of tornadoes in the edge portions of the combined flow of the jets, the tornadoes being spaced from each other toward opposite sides of said common plane and having a zone of laminar flow intervening between the tornadoes, and delivering a stream of attenuable material in attenuable condition into said combined jet flow in the zone of laminar flow and from a point lying in said common plane and offset toward one side of said combined jet flow.

7. A method as defined in claim 6 in which the gaseous jets of each pair have substantially the same kinetic energy per unit of volume.

8. A method as defined in claim 6 in which the angle included between the axes of the jets of each pair is between 10° and 90°.

9. A method as defined in claim 6 in which the jets of each pair are of substantially the same cross sectional size and shape.

10. A method for forming a fiber from attenuable material comprising generating a pair of gaseous jets of substantially the same cross sectional shape and area and with axes lying substantially in a common plane and directed to impinge upon each other at an acute angle to each other and in a zone in said plane, the jets having substantially the same cross sectional dimensions in directions transverse to and in said plane, and delivering a stream of attenuable material in attenuable condition from a point lying in said plane and offset toward one side of the zone of impingement of said jets, the stream of attenuable material being delivered into induced gas in the region of impingement of the jets upon each other.

11. A method for forming fibers from attenuable material, comprising generating a gaseous blast directed in a predetermined path, generating a plurality of pairs of gaseous jets, the jets of each pair being directed along converging axes lying substantially in a common plane to provide for impingement of the jets of each pair on each other with consequent lateral spreading of the combined jet flow of each pair of jets, the pairs of jets being positioned in spaced side-by-side relation with the pairs sufficiently close to each other to provide for lateral impingement of the combined flow of each pair of jets upon the combined flow of adjoining pairs of jets thereby providing for development of pairs of tornadoes in the combined flow of each pair of jets, with a zone of laminar flow intervening between the pairs of tornadoes, and the pairs of jets being positioned so that the combined flow thereof is directed transversely into the blast, the combined jet flow of each pair of jets having greater kinetic energy per unit of volume than that of the blast to provide for penetration of the combined flow of each pair of jets into the blast, and delivering a stream of attenuable material in attenuable condition into the zone of laminar flow of at least one of the pairs of jets.

12. A method for forming a fiber from attenuable material comprising generating a gaseous blast directed in a predetermined path, generating a pair of gaseous jets of substantially the same cross sectional shape and area and with their axes lying substantially in a common plane and directed to impinge upon each other at an acute angle in said plane and merge in a path extended transverse to the path of the blast, the merged jet flow being of smaller cross sectional area and of greater kinetic energy per unit of volume than the blast and the merged jet flow penetrating the blast and creating a zone of interaction with the blast, and delivering a stream of attenuable material in attenuable condition from a zone lying in the plane of the jets and offset toward one side of both of said jets, the stream of attenuable material being delivered into a zone of gas induced by one of the jets in the region of impingement of the jets upon each other and being carried by the merged jet flow into the zone of interaction in the blast.

13. A method for forming a fiber from attenuable material comprising generating a gaseous blast directed in a predetermined path, generating a pair of gaseous jets each of substantially smaller width than the blast and with their axes lying substantially in a common plane and directed to impinge upon each other at an acute angle in said plane and merge in a path extended transverse to the path of the blast, the merged jet flow being of smaller width and of greater kinetic energy per unit of volume than the blast and the merged jet flow penetrating the blast and creating a zone of interaction with the blast, and delivering a stream of attenuable material in attenuable condition from a zone lying in the plane of the jets and offset toward one side of both of said jets, the stream of attenuable material being delivered into a zone of gas induced by one of the jets in the region of impingement of the jets upon each other and being carried by the merged jet flow into the zone of interaction in the blast.

14. A method as defined in claim 13 in which said common plane of the jets cuts through the blast in a position substantially parallel to the direction of flow of the blast.

15. Process for manufacturing fibers from attenuable material by attenuation by means of gaseous currents, characterized in that at least one pair of gaseous jets is developed, said jets having substantially equal kinetic energy per unit of volume, and whose axes are disposed in substantially the same plane, the two jets inducing ambient gas and converging in a zone so as to provoke mutual impact and lateral broadening of the flow formed by the two combined jets, and characterized in that the material is delivered in the form of a stream in attenuable state, at a point in said zone, which point is located outside of the angle included between the two jets.

16. A method for forming a fiber from attenuable material comprising generating a pair of gaseous jets with axes lying substantially in a common plane and directed to impinge upon each other and to produce a downwardly directed combined jet flow, generating a gaseous blast in a path intercepting the combined flow of the jets, and delivering a stream of attenuable material in attenuable condition from an orifice lying in said plane horizontally offset toward one side of both of said jets, the stream of attenuable material being delivered into a zone of gas induced by the combined jet flow in the region of impingement of the jets upon each other, the cross sectional area and kinetic energy of the jets being substantially the same, and the combined flow of the jets having higher kinetic energy per unit of volume than the gaseous blast.

17. Apparatus for forming a fiber from attenuable material comprising means for establishing a pair of gaseous jets of substantially the same kinetic energy per unit of volume and with their axes directed in a common plane at an acute angle to each other so that the jets impinge upon each other in said plane, and means for delivering a stream of attenuable material from a source outside of said acute angle and offset in said plane to one side of both of said jets, the material being delivered from said source in a path lying in said plane, and extended into a zone of gas induced by one of the jets in the region of impingement of the jets upon each other.

18. Apparatus as defined in claim 17 in which the jets have substantially the same cross sectional area.

19. Apparatus as defined in claim 17 in which the angle included between the axes of the jets is between 10° and 90°.

20. Apparatus as defined in claim 17 in which the jets are fed from a common manifold.

21. Apparatus for forming a fiber from attenuable material comprising means for establishing a gaseous blast, means for establishing a pair of gaseous jets with their axes directed in a common plane at an acute angle to each other so that the jets impinge upon each other in said plane and develop a combined jet flow extended toward and penetrating transversely into the blast, and means delivering a stream of attenuable material from a source thereof in attenuable condition in said plane offset to one side of both of said jets, the material being delivered from said source in a path lying in said plane and extended into a zone of gas induced by one of the jets in the regin of impingement of the jets upon each other.

22. Apparatus as defined in claim 21 in which the jets are positioned so that the common plane of the axes of the jets also contains the path of the blast.

23. Apparatus for forming fibers from attenuable material, comprising means for generating a plurality of pairs of gaseous jets with the jets of each pair directed along converging axes lying substantially in a common plane, to provide for impingement of the jets of each pair on each other with consequent lateral spreading of the combined jet flow of each pair of jets, the means for generating the pairs of jets being positioned in spaced side-by-side relation sufficiently close to each other to provide for lateral impingement of the combined flow of each pair of jets upon the combined flow of adjoining pairs of jets thereby providing for development of pairs of tornadoes in the combined flow of each pair of jets, with a zone of laminar flow intervening between the pairs of tornadoes, and means for delivering a stream of attenuable material in attenuable condition into the zone of laminar flow of at least one of the pairs of jets.

24. Apparatus as defined in claim 23 and further including means for generating a gaseous blast directed in a path intercepting the combined jet flow.

25. Device for the manufacture of fibers from an attenuable material by means of gaseous currents, comprising at least one gaseous jet emission element and an attenuable material supply source, characterized in that the gaseous jet emission element comprises jet emission orifices grouped in pairs, the jets issuing from two orifices of the same pair possessing essentially the same kinetic energy per unit of volume and the axes of these two orifices lying substantially in the same plane and in which plane they impinge and form a combined flow, and in that the attenuable material supply orifice is located outside of the angle included between the axes of said two jet orifices in a position providing for delivery of a stream of material in attenuable state, into a zone of induced gases of said combined flow.

* * * * *